United States Patent [19]

Hasty, deceased et al.

[11] Patent Number: 5,303,887
[45] Date of Patent: Apr. 19, 1994

[54] UNIVERSAL PIPE SUPPORT AND HANGER

[76] Inventors: William E. Hasty, deceased, late of Dallas, Tex.; by Melba F. Hasty, legal representative, 5230 Del Roy Dr., Dallas, Tex. 75229; Joseph P. Ismert, 606 E. 117th Terr., Kansas City, Mo. 64131; James M. Farnen, 9738 State Line Rd., Leawood, Kans. 66206; Frank D. Julian, 2 Lone Pine, Cleveland, Mo. 64734

[21] Appl. No.: 845,610

[22] Filed: Mar. 4, 1992

[51] Int. Cl.$^5$ .................................... F16L 3/22
[52] U.S. Cl. .................... 248/68.1; 248/67.5; 248/69
[58] Field of Search ............ 248/65, 67.5, 68.1, 248/69, 70, 60, 61, 62, 63, 56

[56] References Cited

U.S. PATENT DOCUMENTS

| | | | |
|---|---|---|---|
| 998,112 | 7/1911 | Murray | 248/68.1 X |
| 1,050,235 | 1/1913 | Scanlan . | |
| 1,057,057 | 3/1913 | Hoerr | 248/65 |
| 1,129,553 | 2/1915 | Cope | 248/68.1 X |
| 2,288,845 | 7/1942 | Schilling | 248/66 |
| 2,354,919 | 8/1944 | Lockwood | 248/68.1 |
| 2,384,158 | 9/1945 | Carpenter et al. | 248/68.1 |
| 2,675,978 | 4/1954 | Brown | 248/65 |
| 3,357,664 | 12/1967 | Geyer | 248/65 X |
| 3,884,438 | 5/1975 | Logsdon . | |
| 3,944,175 | 5/1976 | Kearney . | |
| 4,267,994 | 5/1981 | Lynch et al. . | |
| 4,717,099 | 1/1988 | Hubbard . | |
| 4,865,280 | 9/1989 | Wollar . | |
| 4,899,963 | 2/1990 | Murphy | 248/65 |
| 4,899,964 | 2/1990 | Sick | 248/68.1 |
| 4,907,766 | 3/1990 | Rinderer . | |
| 4,957,251 | 9/1990 | Hubbard . | |
| 5,054,741 | 10/1991 | Ismert | 248/67.5 X |

Primary Examiner—David A. Scherbel
Assistant Examiner—Korie H. Chan
Attorney, Agent, or Firm—Fitzpatrick, Calla, Harper & Scinto

[57] ABSTRACT

A universal pipe support and hanger system comprising a single support member of generally I-shaped cross-section elongated in a first direction between a proximate end and a distal end, and comprising an elongated central web integrally connected with midpoints of first and second flanges extending substantially at right angles to the web, in a second direction. The proximate end has an L-shaped flange for mounting the single support member against a flat surface or a DMV in at least two orthogonal directions. Upper and lower edges of each flange comprise v-shaped cradles to support pipes extending in a third direction. A plurality of septa extend between opposed inner surfaces of said first and second flanges, on either side of the web, so as to define compartments. A plurality of mounting devices, including a novel preloaded small pipe strap, are adapted to frictionally engage a pair of septa and remain slightly in the web when mounting pipes of varying outer diameters, against one or more of said v-shaped cradles.

18 Claims, 3 Drawing Sheets

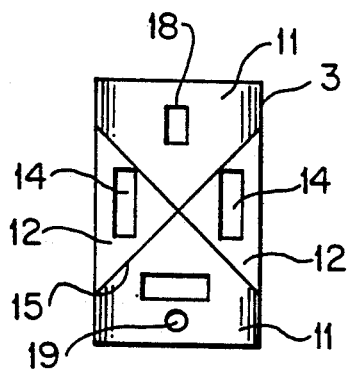
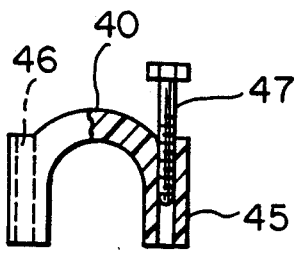
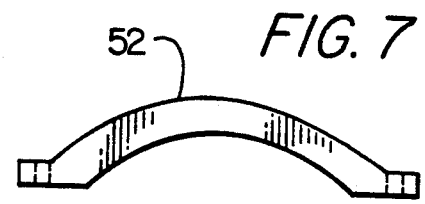
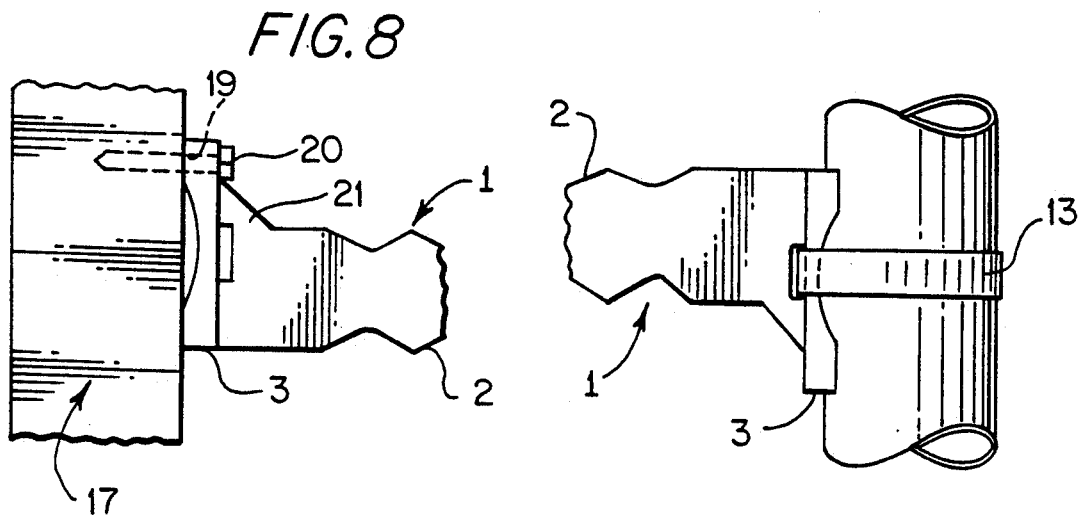
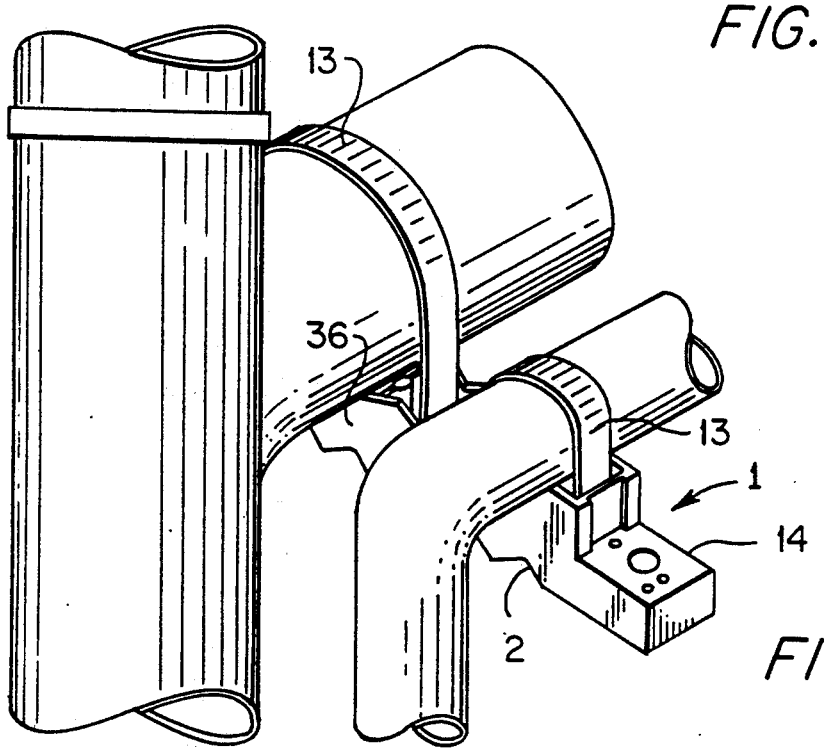

5,303,887

UNIVERSAL PIPE SUPPORT AND HANGER

BACKGROUND OF THE INVENTION

1. Field of Invention

The present invention relates generally to plumbing systems and more particularly to universal pipe support hangers and clamps for use in water and waste pipe systems.

2. Brief Description of the Prior Art

In new building construction, multiple water and drain lines for plumbing fixtures, such as sinks, laundry tubs, bath tubs, lavatories, and other fixtures must be provided. Additionally, electrical lines and conduit runs for circuit breaker boxes, switching panels and related electrical fixtures must be located, some of the electrical conduit lines being run along the water and drain lines. In larger commercial buildings where electrical and plumbing conduit needs exist in large amounts, adequate support and organization of these lines and conduits becomes increasingly important. Failure to provide adequate support separation and retention can easily result in sagging, loosened pipes or severely vibrating lines, all of which may have undesired consequences such as rupture, breakage, and noise from vibration or movement.

In order to prevent these consequences, pipe hanger supports have been developed in many styles. Generally, the hangers are assembled from separate members so as to be adapted to a specific situation, and are not universal in nature.

One such hanger system is disclosed in Kearney (U.S. Pat. No. 3,944,175). Kearney discloses at least three separate pipe support members, each of which is adapted for different applications. A first plastic support is shown in FIGS. 1, 1A and 2 and consists of an elongated planar web with two connected flanges. Upper and lower edges of the flanges have several spaced recesses for receiving pipes oriented in a direction transverse to the elongated web. The web has several clearance holes spaced so that two bolts inserted within a small clamp can pass through, and secure a water supply pipe into a recess by tightening a nut against the opposite side of the web. A curved or compound curved, medial support cut-out also is provided on a lower surface, so that a transversely aligned, large diameter drain, waste or vent pipe (DWV) can be engaged thereagainst by a pair of bolts and a large clamp. A second plastic support, shown in FIGS. 3 and 4, generally comprises a sideways facing, open channel with an elongated web integrally connected to first and second flanges that extend out from one side of the web, at right angles. A lower surface of one flange defines a plurality of recesses and clearance holes which can cooperate with bolts and a small clamp to secure a water pipe in a direction transverse to the elongated web. A curved waste pipe contact section integrally is formed in the upper surface of the opposite flange for securing, via two bolts and a clamp, the pipe support to a DWV extending in a direction parallel to the water pipes (FIG. 3). Two clearance holes through the web also allow affixing the support to a DWV also extending in a direction transverse to the water pipes (FIG. 4). Two versions of a third support, shown in FIGS. 6 and 9, comprise an elongated plastic channel support member with one end defining a T-shaped contact member for clamping to a DWV via a strap, so that the elongated channel can stand-off perpendicular with respect to the DWV. This third support may be bolted together with either of the first two supports, which in turn may be secured to one or more water supply pipes.

Hence, the Kearney approach requires separate pipe supports that often must be bolted together, and difficult manipulations of bolts and nuts to clamp each support against each other or around a pipe. For instance, in order to stand-off several small vertical water pipes against a vertical DWV, it is necessary to make several bolt/nut interconnections, including a fitting together of first and second support members, all as shown by Kearney at FIG. 5. Those interconnections require manipulations that particularly are difficult overhead or in tight chase spaces, where loose water pipes, nuts, clamps and supports all separately must be held in alignment while many nuts are first started on many bolts, and then tightened.

Another prior art approach to this general problem is represented by a set of four plastic support elements, sold by Sumner Manufacturing Co., Inc. of Houston, Tex. as the Sumner Pipe Support and Alignment System. A Posifix ® support is solid plastic with an upper surface pre-slotted to support water lines, a bottom surface with a medial cut-out to engage a DWV that is parallel to the water pipes. Different size plastic clamps, with clearance holes to accept sheet metal screws, are used to secure each pipe. Screw pilot holes are located on either side of each slot and the medial cut-out.

A Pipefix ® support functionally is equivalent to the Posifix ® support, but comprises an elongated central web and integrally connected elongated first and second flanges that extend at right angles to the web. Lower edges of each flange define a plurality of recesses which can cooperate with small clamps to secure pipes in a direction transverse to the elongated web. That securing step requires aligning both a small plastic clamp and a set of two sheet metal screws over pilot holes in the web. The pilot holes are visible on either side of each recess, but the small clamp is loose and must be aligned carefully on the outer surface of the pipe to permit each screw to enter its associated pilot hole, in a web spaced well below the small clamp. A medial DWV curved contact section and another plurality of recesses also are formed in upper edges of each flange. The Pipefix ® upper surface therefore can be secured at a medial location to a DWV via a stainless steel band that passes through slots in the web, or can be secured to one or more parallel water pipes via small plastic clamps and separate sheet metal screws, as in the case of its lower surface.

A plastic Stakfix ® support comprises an elongated channel support member with one end defining a T-shaped contact member for clamping to a DWV via a stainless steel band, so that the elongated channel can stand-off perpendicular with respect to the DWV, in the same fashion as the third support shown by Kearney is intended to stand-off from a DWV.

A simple plastic channel is the fourth part of the Sumner system, and is intended to fit around conventional, P-2000 Unistrut TM metal channel, as an insulating cover, or bolted as bridge between a pair of opposed Stakfix ® stand-off supports.

SUMMARY OF THE INVENTION

The present invention employs a unique single support member and a unique preloaded small pipe strap in combination with conventional pipe clamps and stainless steel bands, so as to define a universal pipe or conduit support/hanger system which provides easier installation configurations than those possible using the above-discussed systems. The single support member of the present invention categorically comprises an elongated central web and integrally connected elongated first and second flanges that extend at right angles to the web; lower edges on the flanges to define a first plurality of recesses; and upper edges on the flanges to define a second plurality of recesses. However, those recesses further are defined by septa perpendicular to the elongated web and extending between the first and second flanges, so as to cooperate with unique preloaded small pipe straps that frictionally engage both a water pipe in a recess, and the support member itself, to greatly facilitate alignments. The single support member further is defined by an overall structure and the spacing of a plurality of holes, slots, grooves and mounting surfaces, so that a plumber or electrician need only carry a single type of support member, and not three or four different types of support members, to meet the challenge of many different pipe or conduit routing situations.

The single support member is defined by a plastic body elongated in a first direction with a generally I-shaped cross-section. An elongated central web integrally is connected with the mid points of first and second flanges elongated in the first direction and extending at right angles to the web, in a second direction. The first plurality of recesses on the upper edge of each flange are cut out to define v-shaped water pipe cradles. Likewise, a second plurality of recesses on the lower edge of each flange are cut out to define v-shaped water pipe cradles. The first and second sets of recesses will support pipes extending in a third direction, substantially perpendicular to both the first and second directions.

At one end of the elongated plastic body a foot is defined by an L-shaped flange, preferably having an external surface with a compound curvature, for mating against a DWV in either of two, orthogonal orientations. One orientation is in the second direction, which is substantially perpendicular to both the first direction and the plane of the elongated web. The other orientation is in the third direction, which is substantially parallel to any pipes held in the first and second sets of recesses.

A plurality of septa extend in the third direction and preferably are spaced between the opposed inner surfaces of the first and second flanges, on either side of the web. This arrangement define a honeycomb-like, very rigid overall structure for the single support member. The septa arrangement makes it possible to safely add a plurality of stainless steel band clearance slots or threaded rod clearance holes through the web, in addition to a plurality of sheet metal screw pilot holes. The septa arrangement also makes it possible to define alignment posts for exactly positioning, and frictionally holding, a unique preloaded small pipe strap over the pilot holes, at each cradle location. The overall rigidity of the single support member still further permits adding a v-shaped pipe cradle at a median location on an outer surface of the first or second flange, for supporting a water pipe or DWV that extends in the second direction.

Accordingly, it is a first object of the present invention to provide a universal pipe and conduit support system that is based upon a single support member.

It is a second object of the present invention to provide a pipe and conduit support system with a unique preloaded small pipe strap that permits an easy and fast frictional alignment of pipes having varying outer diameters.

It is a third object of the present invention to provide a pipe and conduit system that is lightweight, exceptionally strong and easier to align when mounting pipe in a confined area.

It is a fourth object of the present invention to provide a single support member that easily can be molded of non-conductive, non-corrosive plastic materials that insulate against passage of electrical energy and provide electrolytic isolation.

It is a fifth object of the present invention to provide such a pipe support which meets many of the fire, building and other safety code requirements governing the construction industry.

Other objects and advantages of the present invention will become apparent from the following detailed description of preferred embodiments, wherein reference is made to the accompanying drawings.

BRIEF DESCRIPTION OF THE DRAWINGS

FIG. 5 is an end elevational view of the single support member from the first embodiment;

FIG. 6 is a side elevational, section view of the preloaded small pipe strap shown in place over septa and pilot holes, in FIG. 1;

FIG. 7 is a side elevational view of a portion of a conventional pipe clamp, as shown in FIG. 1;

FIG. 8 is a fragmentary elevational view showing a nailing connection of the first embodiment single support member to a planar wall surface;

FIG. 9 is a fragmentary elevational view showing one stainless steel banding orientation of the first embodiment single support member to a DWV;

FIG. 10 is a perspective view showing one possible stainless steel banding installation of the first embodiment single support member;

DESCRIPTION OF THE PREFERRED EMBODIMENTS

Two preferred embodiments of the present invention are disclosed hereafter. These disclosed embodiments merely are illustrative of the invention, which may be embodied in various forms. Therefore, specific structural and functional details disclosed herein are not to be interpreted as limiting, but merely as providing a proper basis for the claims and as a representative basis for teaching one skilled in the art to employ the universal pipe support and hanger. For the sake of clarity, the preferred embodiments and claims will refer to a first direction, a second direction and a third direction each of which being substantially perpendicular to the other two, and as described hereinbefore.

Figure 1:
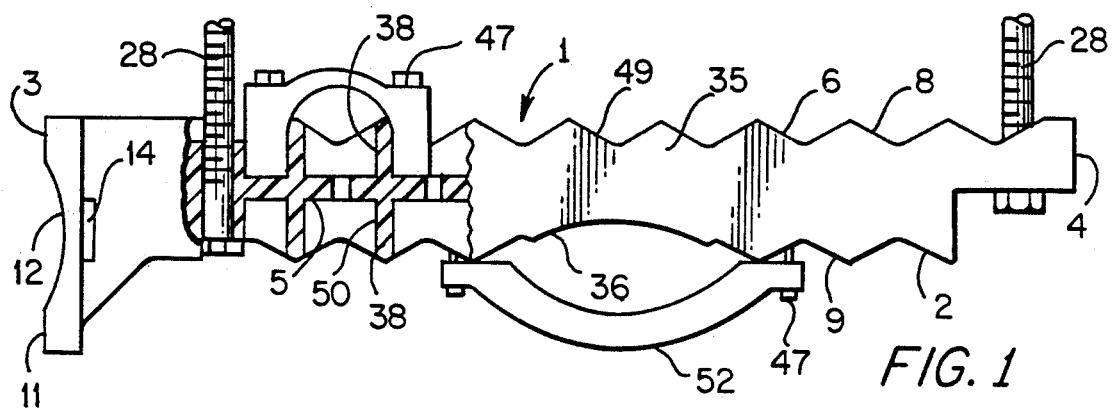
FIG. 1 is a side elevational view, in partial section, showing the basic elements of a first embodiment for a pipe or conduit support system, according to the present invention.

FIG. 1 schematically illustrates a first embodiment for a universal pipe and conduit support system 1 according to the present invention. The single support member 2 is plastic and elongated in a first direction with a generally I-shaped cross section, having opposite ends 3 and 4. An elongated central web 5 integrally is connected with the mid points of first and second flanges 6, 7. The flanges also are elongated in the first direction and extend at right angles to the web, in a second direction. The upper edges of each flange are cut out with a first plurality of recesses 8 to define nine v-shaped water pipe cradles 49. Likewise, a second plurality of recesses 9 on the lower edges of each flange are cut out to define two or three v-shaped water pipe cradles 49, on either side of a median curved, or compound curved, surface such as the illustrated radius 36. The first and second sets of recesses 8, 9, will support pipes extending in a third direction, that is substantially perpendicular to both the first and second directions. A first large median recess 35 in the side wall of the first flange 6 will support a DWV that extends in the second direction. A second large median recess 36 in the lower surface of the flanges, between two sets of the second plurality of recesses 9, will support a DWV that extends in the third direction. Either surface 35, 36 also may be of a compound curvature, such as a v-shape.

At one end of the elongated single support member 2 there is a foot 3 that is defined by an L-shaped flange. As shown in FIG. 1 the foot extends vertically from an upper end that makes a substantially square corner proximate the top surface, to a distal end, located below the second set of recesses. The foot preferably has an flange external surface, elongated in the second direction, that has a compound curvature, for mating against a DWV in either of two, orthogonal orientations, as illustrated in FIGS. 1, 2, 3 and 5. One curvature 11 permits orientation against a DWV extending in the second direction, which is substantially perpendicular to both the first direction and the plane of the elongated web. A second curvature 12 permits orientation against a DWV extending in the third direction, which is substantially parallel to any pipes held in the first and second sets of recesses. Either surface 11, or 12 may also be of compound curvature, such as a v-shape. In FIG. 9, the L-shaped foot is shown supported by a stainless steel band against a section of the outer circumference of a DWV which extends in the second direction. To affix the pipe support and hanger 1 against an upright DWV, as shown in FIG. 9, a stainless steel band 13 simply is fed through pairs of slots that extend in either the second or third directions. One pair of band slots 14, is shown in FIG. 5. To affix the pipe support and hanger 1 against a horizontal DWV, or perpendicular to the mounting position that is shown in FIG. 9, a band 13 simply is run through band slot 15 in bottom portion of the L shaped foot 3 and a band slot 17 in the planar web.

As shown in FIGS. 5 and 8, the foot external surface also defines a set of four coplanar contact surfaces, to permit flat mounting and a nailing of the foot into a wall stud. A nail clearance hole 19 is spaced below the lower surface to facilitate hammer contact. In order to affix the end 3 to an upright body such as a wood or metal stud 17, as shown in FIG. 8, both the lower nail or screw clearance hole 18 and an elongated upper nail or screw clearance slot 18 are provided. The upper hole permits angled entry of a nail, or screw and is surrounded by reinforcing ribs 21 which strengthen the immediate area. The L-shape permits a tight corner mounting, wherein the support member upper surface and the flange external surface each can be pressed against a mounting surface.

Each of the plurality of septa 38 is a substantially planar element that extends in the third direction. The septa preferably are spaced uniformly in the first direction, and extend in the third direction between the opposed inner surfaces of the first and second flanges, 6 and 7, on either side of the web 5. This arrangement defines a honeycomb-like, very rigid overall structure for the single support member. The septa arrangement makes it possible to safely add a plurality of stainless steel band clearance slots 15, 32 or threaded rod clearance holes 23, 29 through the web, in addition to a plurality of sheet metal screw pilot holes 33. The septa arrangement also makes it possible to define alignment posts 30, 41 for exactly positioning, and frictionally holding, a unique preloaded small pipe strap of the type shown in FIG. 6 over the pilot holes at each cradle location, as illustrated in FIG. 1. Each septa extends, in the second direction, above a web surface about 0.65 inches, so that a sufficient frictional contact area is defined for use of a preloaded small pipe strap with water pipes sizes between one-half and seven-eighths inches. In FIG. 1. one of the preloaded small pipe straps 47 is shown moved completely down on a pair of septa 38, to illustrate a minimum clamping space.

Unlike prior art supports, the single support member 2 has a pair of medial recessed areas 35 and 36, of compound curvature or radiused to greatly enhance its utility. The overall rigidity of the single support member permits adding even a first large radius 35, or v-shaped compound surface, at a median location on an outer surface of the first flange 6, for supporting a water pipe or DWV that extends in the second direction, and a second large radius 36, or v-shaped compound surface, at a median location on the lower surfaces of both first flanges, for supporting a water pipe or DWV that extends in the third direction.

Figure 2:
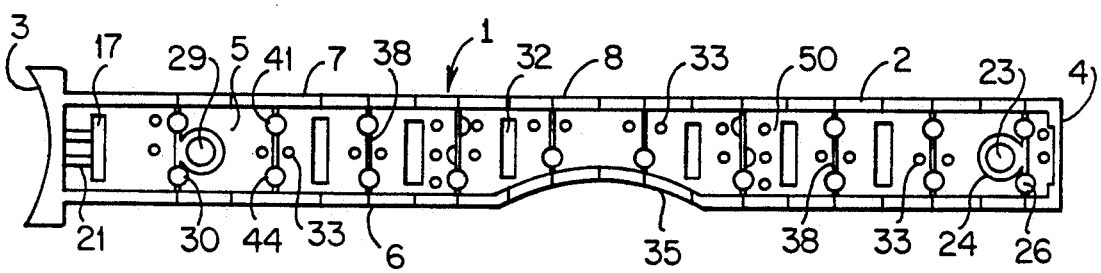
FIG. 2 is a top plan view of the single support member from the first embodiment.
Figure 3:
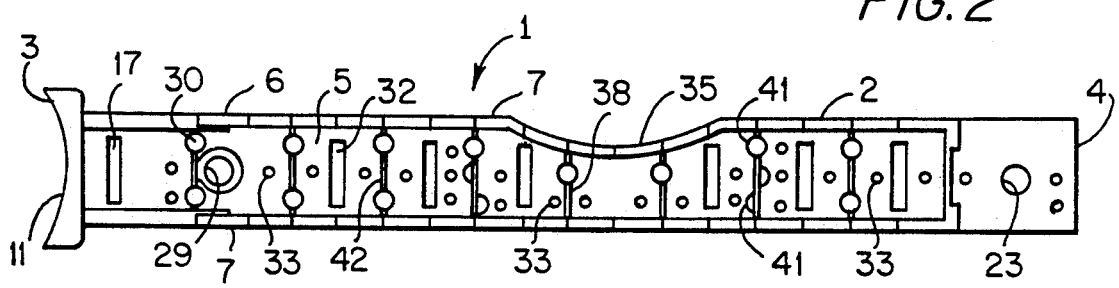
FIG. 3 is a bottom plan view of the single support member from the first embodiment.
Figure 4:
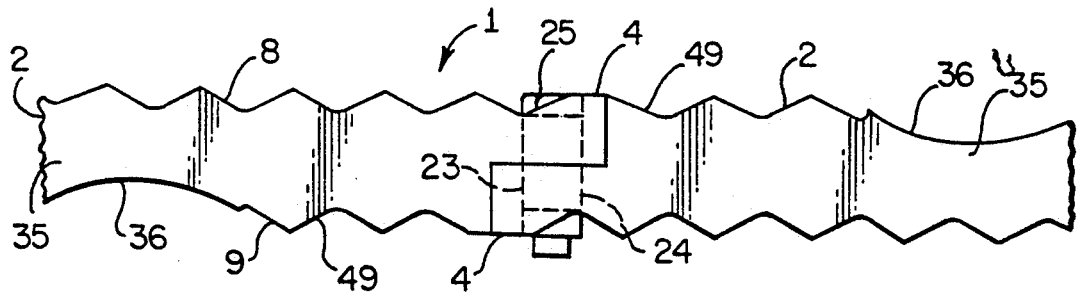
FIG. 4 is a side elevational, fragmentary view showing an end to end connection of two single support members from the first embodiment.

The first embodiment of a single support member 2 has a distal end 4 configured to allow an end-to-end, dovetail connection with a single support member 2 that is inverted. FIG. 4 illustrates such a double trapeeze arrangement. Each of the ends 4 is notched to exactly a half height, and the web 5 wall thickness in that notch area also is one-half the remaining wall thickness. The distal end 4 includes a vertical threaded rod clearance hole 23 surrounded by a reinforcing bushing 24, whereby a pair of distal ends 4 can be positioned in an inverted relationship, as shown in FIG. 4 and joined together by a connecting bolt 25. A septum with a pair of alignment posts 26, on the lower section of the distal end, as shown in FIG. 2, further strengthens the bushing 24 with respect to the flange walls 6 and 7.

The threaded rod clearance hole 23 adjacent the distal end 4 has a dual function, in that it also can be used for defining a double trapeeze interconnect or for suspending the distal end from a vertical threaded hanger rod 28 attached to some overhead structure, as shown in FIG. 1. Similarly, the proximate, or L-shaped foot, end 3 includes adjacent thereto a threaded rod clearance hole 29 inside of a reinforced boss 30, to accept another vertical threaded hanger rod.

The elongated, central web 5 runs lengthwise of the single support member 2 in the first direction and includes multiple screw pilot holes 33 and band clearance slots 32, within compartments defined along the first direction by the septa. The compartment structure greatly strengthens the entire member, and permits various locations for tightly mounting a stainless steel band, clamp or small pipe strap against either a DWV, a water pipe or an electrical conduit, as necessary. The novel septa 38 and alignment posts 41 not only provide strengthening for web 5 and the flanges 6 and 7, they also are configured for a frictional fit with the novel preloaded small pipe straps 40, as shown in FIG. 6. The alignment posts 41 are of the same height as the septa 38, and provide channels 42 for snug, sliding friction contact against inner surfaces on the legs 44 and 45 of the novel preloaded small pipe straps 40.

As shown in FIG. 6, the legs 44 and 45 of the pipe straps 40 have opposed inner surfaces that extend significantly away from the inner curvature for about 0.625 inches and have a slight convergence, so as to create a horseshoe-like vertical elevation. The pipe straps are preferably made of polypropylene, to enhance flexure. The inner curvature preferably is round and with a diameter of about 1.05 inches, so as to accommodate up to a seven eights inch water pipe, which has an outer diameter of 1.05 inches. The legs are intended to be slightly spread apart, by squeezing the upwardly extending screw heads together between thumb and forefinger, and then slid down onto and along a pair of septa. Hence, each of the screws 47 preloaded into pilot holes 46 of legs 44 and 45 then will be aligned directly above a pilot hole 33 in the web, and the held pipe will remain engaged against a v-shaped cut-out surface by that frictional contact. A small diameter water pipe or conduit so constrained by the friction between the strap and the septa can very quickly then be secured—without need for further alignment assistance—simply by driving both screws 47. The pipe straps 40 are preloaded with screws 47 so that the pointed ends are substantially near the bottom surfaces of the legs 44, 45 and are aligned so as to move downwardly and self-tap into a pilot hole 33.

Each v-shaped cradle surface 49 preferably is spaced at a one inch pitch in the first direction on both the top and bottom edges 8 and 9 of the flanges 6 and 7. Each honeycomb-like compartment 50, with boundaries defined by a pair of septa 38 therefore also is spaced about 1.0 inches apart, and preferably includes a web portion with a central stainless steel band clearance slot and two 0.09 inch diameter pilot holes 33. If a DWV pipe is to be supported in any one of the 0.20 inch v-shaped water pipe cradle depths defined by each recess, then a stainless steel band can be fed through more than one set of band clearance slots, depending on the DWV diameter. Hence, each of the v-shaped cradle surface 49 will accommodate from a half-inch up to a seven eights inch water pipe, simply by engaging preloaded small pipe straps 40, as shown in FIG. 1. Each v-shaped cradle surface 49 also can function as a locating means for several sizes of much larger diameter pipes. The plurality of stainless steel band clearance slots spaced along the web, and the rigidifying septa, permit bands to be securely tightened around even large size DWV pipes, without fracturing the web.

A conventionally shaped, large plastic pipe clamp 52, as shown in FIG. 7, having an inner surface approximately the same radius as the medial recess areas 35 and 36, may also easily be attached to the single support member 2 by elongated sheet metal screws 47, as shown in FIG. 1. This arrangement permits first mounting the single support member 2 about a large conduit or pipe 53 and then quickly locating several loose pipes, either for water or as electrical conduits, within the sets of v-shaped cradles 49 by squeezing several preloaded small pipe straps 40 down onto several sets of septa. The large pipe clamp 52 preferably is formed so that screw holes in each foot portion substantially align with a pair of screw pilot holes 33 in the single support member 2, and the presence of a pilot hole on either side of each septum further visually assists in quickly starting a sheet metal screw into an appropriate pilot hole.

Figure 11:
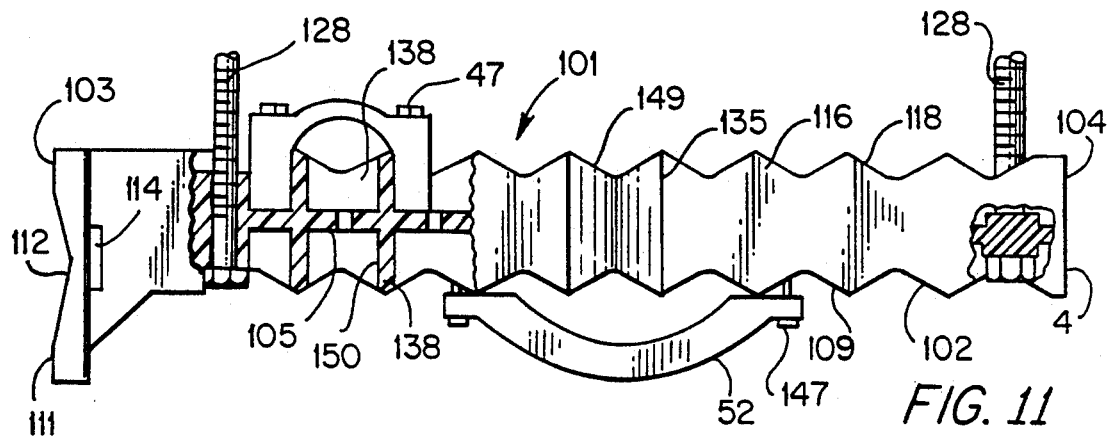
FIG. 11 is a side elevational view, in partial section, showing the basic elements of a second embodiment for a pipe and conduit support system, according to the present invention.

FIG. 11 schematically illustrates a second embodiment for a universal pipe, either water or electrical, support system 101, according to the present invention. The single support member 102 also is plastic and elongated in a first direction with a generally I-shaped cross section, having a proximate end 133 and a distal end 144. At the proximate end of the elongated single support member 102 there also is a foot 103 that is defined by an L-shaped flange. As shown in FIG. 11 the foot extends vertically from an upper end that makes a substantially square corner proximate the top surface, to a distal end, located below the second set of recesses. The foot preferably has an flange external surface, elongated in the second direction, that has a compound curvature defined by two intersecting, substantially v-shaped surfaces, 103 and 112, for mating against a DWV in either of two, orthogonal orientations. Band clearance slots, 114, 117, coplanar surfaces 111, septa 138, alignment posts 144, pilot holes 133 and reinforcement ribs 121 each function in the manner discussed in connection with FIG. 1.

An elongated central web 105 integrally is connected with the mid points of first and second flanges 106, 107. The flanges also are elongated in the first direction and extend at right angles to the web, in a second direction. The upper edges of each flange are cut out with a first plurality of recesses 108 to define a continuous first set of nine v-shaped water pipe cradles 149, each with somewhat sharp edges and preferably spaced 1.0 inches apart with a depth of about 0.20 inches. Likewise, a second plurality of recesses 109 on the lower edges of each flange are cut out to define another continuous second set of nine v-shaped water pipe cradles, about 0.20 inches deep. The first and second sets of recesses 108, 109, will support pipes extending in a third direction, that is substantially perpendicular to both the first and second directions.

Figure 12:
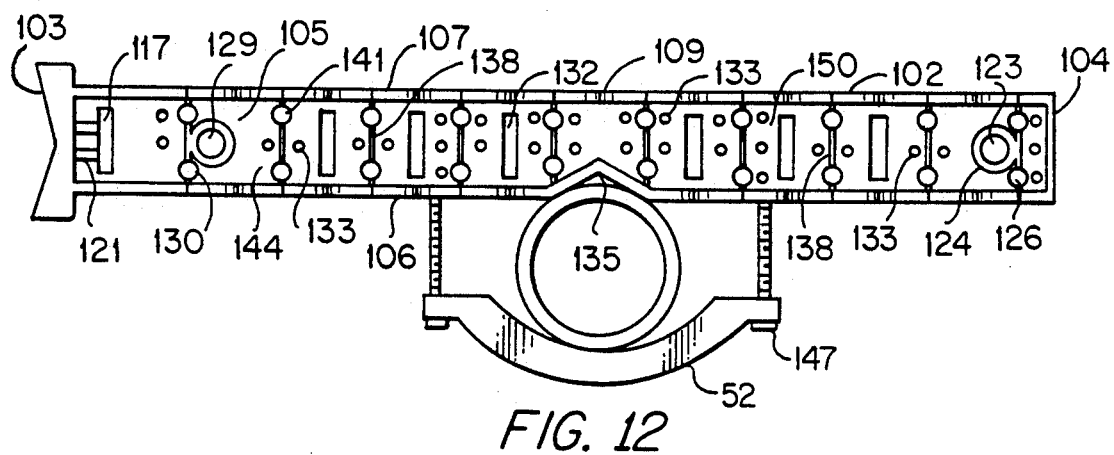
FIG. 12 is a top plan view of the single support member from the second embodiment of FIG. 11
Figure 13:
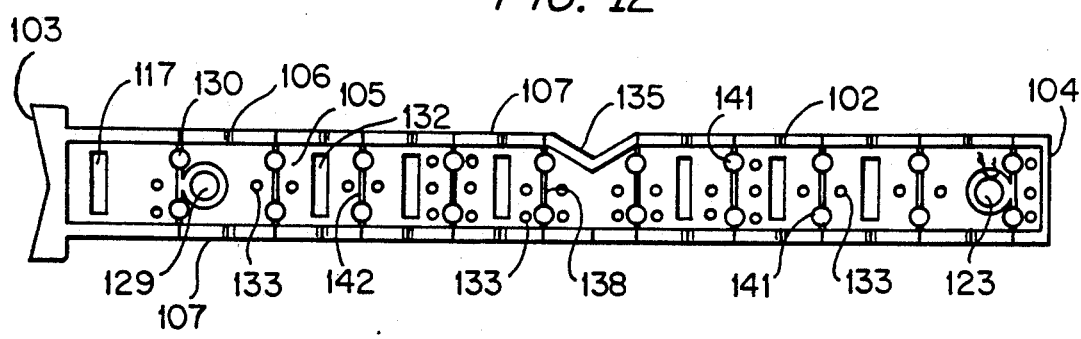
FIG. 13 is a bottom plan view of the single support member from the second embodiment of FIG. 11.

As shown in FIGS. 11, 12 and 13, a single median v-shaped cradle recess 135 is formed in the planar, outer side wall portion of the first flange 106. This cradle is also about 1.0 inches wide with an 0.20 inch depth, so as to be capable of supporting a DWV that extends in the second direction, by applying a conventional band 113 or plastic clamp, 152 and inserting screws into each pilot hole. One or more pair of 0.09 inch diameter pilot holes, about 3.75 inches apart, will accomodate the same diameter sheet metal screws used to self tap into the web.

Instead of a single, large median recess 36 in the lower surface of the flanges, as in the first embodiment of FIG. 1, in the second embodiment of FIG. 11 any one of nine equally spaced recesses 149 is capable of supporting a DWV that extends in the third direction, simply by inserting a band 113 through one set of the several stainless steel band clearance slots 132, which are defined in the elongated web 105.

Instead of using the novel preloaded small pipe straps 47, or conventional large clamps 52, pipes extending in the third direction also can be connected to either embodiment of a single support member 2, 102 with several bands, as shown in FIG. 10. A stainless steel band 13, is passed about the pipe and extended through selected slots 32, and then tightened as necessary. In this manner, various pipes and conduits can be securely fastened to either single support member, without several parts being juggled. The septa and compartments also are spaced to permit a uniform means of locating parallel piping or conduit in one-inch increments or progressions beginning at the medial point of the single support member. The even and premeasured spacing of the septa 38, 138 and compartments 50, 150 allows for neat and orderly pipe and conduit alignments, unaided by separate measuring devices.

Preferably, the single support member 2, 102 and any securing devices, such as the preloaded small pipe straps 40 or the DWV plastic clamps 52, are formed of non-conductive, non-corrosive material, such as a high impact resistant polystyrene which aids insulation against passage of electricity and provides electrolytic isolation. The proximate end and upper surface of the single support member 2, 102 also are configured square, and in such a manner as to accept screws, nails, or other connecting devices for fastening to any number of structural building members, including steel or wooden joists, studs, timbers or even concrete with proper anchoring.

While two preferred embodiments of the invention have been shown and described, those skilled in the art will recognize that additions and modifications can be made thereto without departing from the spirit of the invention. The following claims are intended to define the scope of protection so as to include all such additions and modifications.

We claim:

1. A universal pipe support and hanger system comprising:
   a single support member, of generally I-shaped cross-section, elongated in a first direction between a proximate end and a distal end, said support member including an elongated central web integrally connected with midpoints of first and second flanges, said flanges extending substantially at right angles to the web, in a second direction, wherein
   the proximate end has flange means for mounting the single support member against a surface in at least two orthogonal directions;
   upper edges of each of said first and second flanges comprise a first plurality of recesses that define v-shaped cradles to support pipes extending in a third direction, substantially perpendicular to both said first and second directions, and lower edges of each of said first and second flanges comprise a second plurality of recesses that define v-shaped cradles to support pipes extending in the third direction; and
   a plurality of septa extend between opposed inner surfaces of said first and second flanges, on either side of the web, so as to define compartments, and at least one mounting means adapted to engage one of said compartments and extend through said web, so as to permit mounting of pipes, with varying outer diameters, against one or more of said v-shaped cradles.

2. A universal pipe support and hanger system according to claim 1, wherein said septa extend in the third direction and the mounting means comprise pipe straps, each of said pipe straps having an inner surface and a pair of legs extending therefrom to define opposed inner leg surfaces that are adapted to frictionally engage outer surfaces of a pair of septa.

3. A universal pipe support and hanger system according to claim 2, wherein said septa uniformly are spaced on at least one side of the web along the first direction, the opposed inner leg surfaces of each pipe strap slightly converge as they extend away from a curved or compound curved inner surface of the pipe strap, and the pipe strap is preloaded with at least one screw that extends in the second direction at least partially through at least one of said pair of legs, so as to facilitate a spreading of said legs and the engagement of said legs and said pair of septa.

4. A universal pipe support and hanger system according to claim 3, wherein said septa further comprise at least one alignment post positioned so as define a location at which said legs of said pipe straps engage said septa so that the preloaded screw is directly above a pilot hole in said web.

5. A universal pipe support and hanger system according to claim 1, wherein said proximate end flange means further comprises a flange external surface, having a compound curvature, for mating against a curved surface extending in either of said two orthogonal directions, and wherein band clearance slots extend through said support in the second and third directions.

6. A universal pipe support and hanger system according to claim 5, wherein one orientation is in the second direction and the other orientation is in the third direction, and said end flange further comprises four coplanar contact surfaces which permit mounting of the end flange external surface against a flat mounting surface.

7. A universal pipe support and hanger system according to claim 5, wherein said end flange is L-shaped, with an upper surface substantially coplanar with the upper edges of said first and second flanges, and wherein said flange external surface is substantially perpendicular to the end flange upper surface and extends, in the second direction, below the lower edges of said first and second flanges.

8. A universal pipe support and hanger system according to claim 6, wherein said end flange includes at least one clearance hole to permit nailing or screwing of said four coplanar contact surfaces against said mounting surface.

9. A universal pipe support and hanger system according to claim 1, wherein the mounting means further comprises at least one stainless steel band clearance slot through a web portion in a compartment, and a pair of sheet metal screw pilot holes through said web portion and adjacent the septa defining said compartment.

10. A universal pipe support and hanger system according to claim 1, wherein the mounting means further comprises at least one threaded rod clearance hole through said web portion adjacent the proximate end and at least one threaded rod clearance hole through said web portion adjacent the distal end.

11. A universal pipe support and hanger system according to claim 1, wherein the distal end further comprises a notch defining a dimension in the second direction approximately one half that of the adjacent support member, and a threaded rod clearance hole through said notch portion in the second direction, whereby the distal ends of two such support members can be inverted and joined together end to end to define a double trapeeze support member.

12. A universal pipe support and hanger system according to claim 1, wherein the first plurality of of recesses define v-shaped cradles on sustantially one inch centers and the second plurality of recesses define v-shaped cradles on sustantially one inch centers.

13. A universal pipe support and hanger system according to claim 1, wherein the first plurality of of recesses define v-shaped cradles on sustantially one inch centers and the second plurality of recesses define two sets of v-shaped cradles on sustantially one inch centers, and the sets are disposed on either side of a cutout of compound curvature.

14. A universal pipe support and hanger system according to claim 1, wherein said first and second flanges further include a compound curvature section, wherein the first plurality of recesses define v-shaped cradles on substantially one inch centers, and the second plurality of recesses define two sets of v-shaped cradles on substantially one inch centers, said sets being disposed on either side of a first cutout portion of said compound curvature section, and wherein a second cutout portion of said compound curvature section is defined within a planar outer side wall portion of one of said first and second flanges.

15. A universal pipe support and hanger system according to claim 1, wherein the first plurality of recesses define v-shaped cradles on sustantially one inch centers, the second plurality of recesses define v-shaped cradles on sustantially one inch centers, and at least one v-shaped cradle is defined within a planar outer side wall portion of at least one of said first and second flanges, to permit support of a pipe extending in the second direction.

16. A universal pipe support and hanger system according to claim 1, wherein the septa are located at apexes between the v-shaped cradles.

17. A universal pipe support and hanger system according to claim 1, wherein said proximate end flange means further comprises a flange external surface, having a compound curvature, for mating against a drain, waste or vent pipe in either of said two orthogonal directions.

18. A universal pipe support and hanger system according to claim 1, wherein said mounting means are generally U-shaped.

* * * * *